United States Patent [19]
Hatanaka et al.

[11] Patent Number: 6,120,679
[45] Date of Patent: *Sep. 19, 2000

[54] METHOD OF HYDRODESULFURIZING CATALYTIC CRACKED GASOLINE

[75] Inventors: Shigeto Hatanaka, Kanagawa; Osamu Sadakane, Tokyo, both of Japan

[73] Assignee: Nippon Mitsubishi Oil Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/149,294

[22] Filed: Sep. 9, 1998

[30] Foreign Application Priority Data

Sep. 24, 1997 [JP] Japan ................................ 9-276525

[51] Int. Cl.$^7$ .......................... C10G 45/04; C10G 45/08

[52] U.S. Cl. .................. 208/217; 208/216 R; 208/236; 208/209

[58] Field of Search .......................... 208/216 R, 217, 208/209, 236

[56] References Cited

U.S. PATENT DOCUMENTS 4,314,901   2/1982   Nowack et al. .................... 208/216 R

*Primary Examiner*—Walter D. Griffin
*Assistant Examiner*—Tam M. Nguyen
*Attorney, Agent, or Firm*—Sughrue, Mion, Zinn, Macpeak & Seas, PLLC

[57] ABSTRACT

A method of hydrodesulfurizing a catalytic cracked gasoline which comprises providing a presulfided catalyst modified with a basic organic nitrogen compound and contacting the catalytic cracked gasoline with the catalyst.

14 Claims, 1 Drawing Sheet

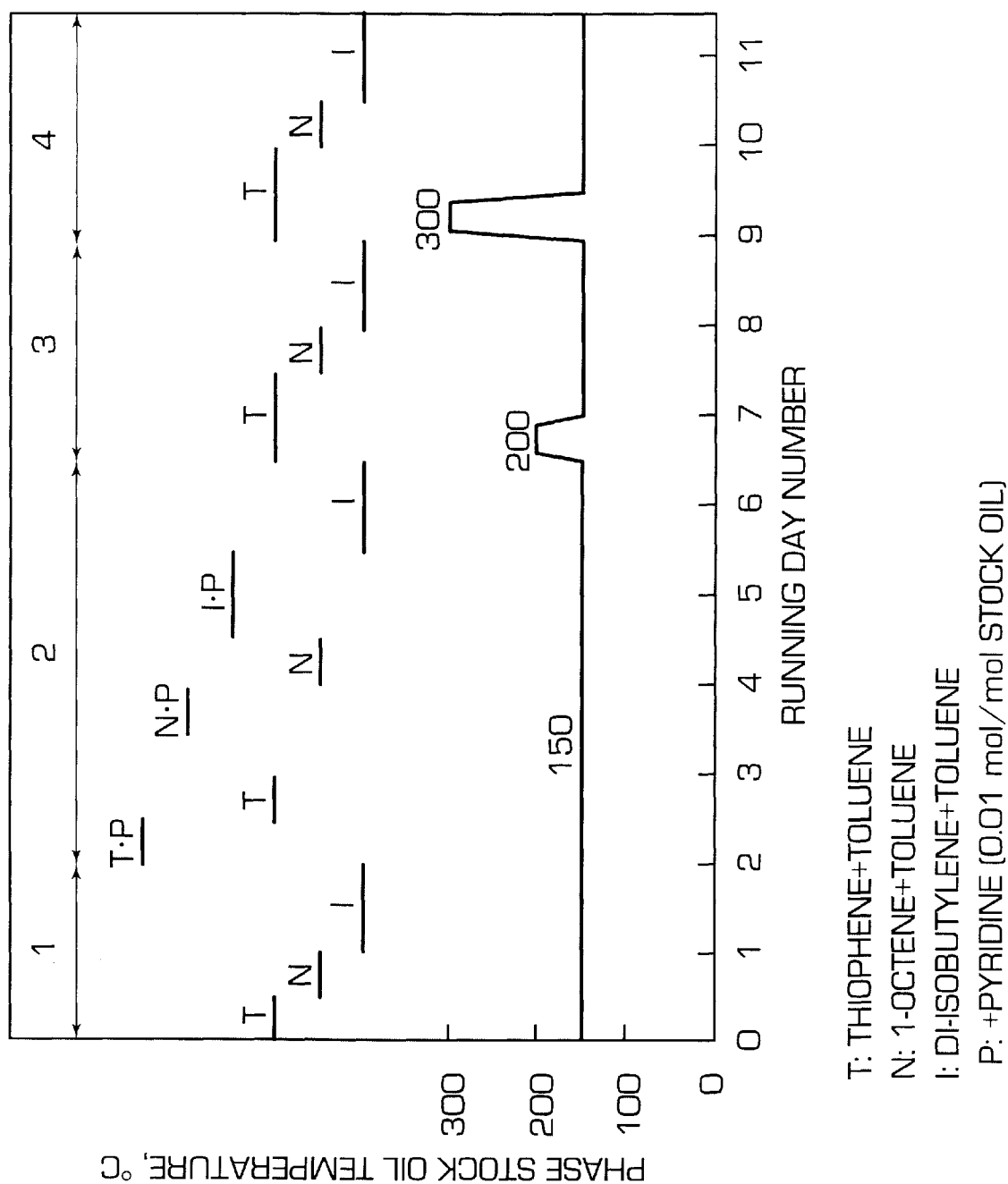

METHOD OF HYDRODESULFURIZING CATALYTIC CRACKED GASOLINE

FIELD OF THE INVENTION

The present invention relates to a method of hydrodesulfurizing a sulfur-containing catalytic cracked gasoline, which method can suppress the hydrogenation of olefins generated concomitantly with the hydrodesulfurization reaction. More particularly, the hydrodesulfurization method of the present invention minimizes a decrease in octane number by using a catalyst treated with a basic organic nitrogen compound.

BACKGROUND OF THE INVENTION

Catalytic cracked gasoline is an important gasoline mixture source. Namely, catalytic cracked gasoline has a high olefin content of from 20 to 40% and therefore has a high octane number, and constitutes up to 50% of the raw material of a gasoline. The catalytic cracked gasoline is produced by catalytic cracking a vacuum gas oil and an atmospheric residual oil using a fluidized catalytic cracking apparatus. In this production process, sulfur contained in these heavy oils is also subjected to various cracking reactions. Thus, the catalytic cracked gasoline is characterized as including sulfur compounds.

In order to suppress the sulfur content of catalytic cracked gasoline to a low level, generally hydrodesulfurized vacuum gas oil and atmospheric residual oil are used as stock oils (feedstocks) for catalytic cracking. However, the hydrodesulfurization apparatus of these heavy oils is used at high temperature and under high pressure. Therefore, in order to respond to continuously imposed severe regulations for protecting the environment, the provision of new or additional facilities as well as the increase in capacity of existing apparatuses disadvantageously requires a large investment.

Sulfur compounds contained in catalytic cracked gasoline can be hydrodesulfurized by means of an apparatus which can be operated at a relatively low temperature and under a relatively low pressure. Therefore, if catalytic cracked gasoline can be directly hydrodesulfurized, the investment in plant and equipment can be relatively inexpensive and also the operating cost is advantageously lower than that of the hydrodesulfurization of heavy oil.

When catalytic cracked gasoline is hydrodesulfurized according to a conventional technique, e.g., using a naphtha hydrodesulfurization apparatus, olefins are disadvantageously hydrogenated to decrease the octane number. In order to prevent this decrease in octane number, various methods have been proposed, e.g., a technique in which a stock oil is separated into a light fraction and a heavy fraction by distillation and the resulting respective fractions are hydrodesulfurized under different conditions (U.S. Pat. No. 4,990,242); a method using a catalyst modified with an alkali metal (JP-A-8-277395); a method for preventing a decrease in the octane number by using an acidic catalyst comprising synthetic zeolite (U.S. Pat. No. 5,352,354); and a method using a catalyst subjected to a regular pretreatment (U.S. Pat. No. 4,149,965). However, these techniques have various problems, and their performance is not sufficient to prevent a decrease in the octane number.

It is therefore an object of the present invention to solve the above-described problems of the prior art, and to provide a method for effectively conducting hydrodesulfurizion while preventing the hydrogenation of olefins, as well as to provide a catalytic cracked gasoline processed by the hydrodesulfurization method.

SUMMARY OF THE INVENTION

The present inventors have conducted extensive studies and research in order to solve the above-described problems of the prior art. As the result, the present inventors discovered a method of modifying a catalyst with a basic organic nitrogen compound so as to increase the selectivity of the hydrodesulfurization reaction relative to the hydrogenation of olefins to thereby achieve the present invention.

That is, the above-described objects of the present invention are achieved by providing:

1. A method of hydrodesulfurizing a catalytic cracked gasoline which comprises contacting a catalytic cracked gasoline with a presulfided catalyst modified with a basic organic nitrogen compound, said catalyst comprising cobalt-molybdenum or nickel-molybdenum supported on an alumina carrier.

2. The method as described in item 1 above, wherein the basic organic nitrogen compound comprises an (alkyl) pyridine.

3. The method as described in items 1 or 2 above, which comprises contacting the presulfided catalyst with the basic organic nitrogen compound at a temperature of 200° C. or lower and then hydrodesulfurizing after raising the temperature to 250° C. or higher.

BRIEF DESCRIPTION OF THE DRAWINGS

The FIGURE reflects the results of an experimental model experiment, and is a graph showing the relationship between running day number and temperature.

DESCRIPTION OF THE PREFERRED EMBODIMENTS

In order to suppress the hydrogenation of olefins and to readily effect a desulfurization reaction, the hydrodesulfurization active site of a catalyst must be different from the hydrogenation active site for hydrogenating an olefin, and a technique for independently controlling these active sites is also needed. At the beginning of their research, the present inventors examined whether or not the hydrodesulfurization active site of a catalyst differs from the hydrogenation active site for hydrogenating an olefin.

It is known that hydrogen sulfide is competitively adsorbed on a coordinatively unsaturated active site of a catalyst to thereby interfere with the hydrodesulfurization reaction. If the hydrodesulfurization reaction and the hydrogenation reaction of an olefin proceed at the same active site, the addition of hydrogen sulfide would poison both reactions. From the results of an experiment, it was found that the addition of hydrogen sulfide poisons the hydrodesulfurization reaction and the hydrogenation reaction of n-olefins, but activates the hydrogenation reaction of iso-olefins. Thus, it was confirmed that the hydrogenation active site of iso-olefins contained in large amount in catalytic cracked gasoline differs from the hydrodesulfurization active site.

Hydrogen sulfide poisons the hydrodesulfurization reaction and accelerates the hydrogenating reaction of iso-olefins. This effect is opposite the objective of the present invention. Thus, a basic organic nitrogen compound which competitively adsorbs on a coordinatively unsaturated active site as does hydrogen sulfide and having a basic property was sought.

It is known that when a basic organic nitrogen compound is present in the hydrodesulfurization reaction of thiophene, the basic organic nitrogen compound is competitively adsorbed on a coordinatively unsaturated active site of a catalyst to interfere with the hydrodesulfurization reaction. The adsorbed basic organic nitrogen compound is soon desorbed to result in hydrocracking and, therefore, the poisoning effect was considered to be reversible.

The present inventors have examined in detail the functional mechanism of a basic organic nitrogen compound relative to the active site of a catalyst. As the result, it was found that by modifying the catalyst with the basic organic nitrogen compound, the hydrogenation activity of olefins is considerably decreased while the desulfurization activity is maintained, whereby the hydrodesulfurization selectivity is improved.

An experimental method is shown in the FIGURE. A presulfided catalyst comprising 4 wt % of CoO and 15 wt % of $MoO_3$ supported on alumina was used. As model compounds, thiophene ($2.83 \times 10^{-4}$ mol/mol toluene solution) represented by T in the FIGURE, 1-octene (20 mol % toluene solution) represented by N in the FIGURE and diisobutylene (20 mol % toluene solution) represented by I in the FIGURE were used and depending on the intended objective, experiments 1 to 4 were carried out. The results are shown in Table 1. The experimental objectives and results are shown below. Detailed reaction conditions are also shown in Table 1.

TABLE 1

| phase | 1 initial activity | 2 presence of pyridine | 2 absence of pyridine | 3 after heating at 200° C. | 4 after heating at 300° C. |
|---|---|---|---|---|---|
| thiophene hydrodesulfurization percentage (wt %) | 51.1 | 8.9 | 43.6 | 45.9 | 50.5 |
| (reaction rate constant after treatment/initial reaction rate constant) | | (0.13) | (0.81) | (0.86) | (0.99) |
| 1-octene hydrogenation percentage (vol %) | 32.8 | 3.9 | 15.7 | 16.5 | 20.9 |
| (reaction rate constant after treatment/initial reaction rate constant) | | (0.10) | (0.43) | (0.45) | (0.59) |
| diisobutylene hydrogenation percentage (vol %) | 9.4 | 0.3 | 1.9 | 2.8 | 4.3 |
| (reaction rate constant after treatment/initial reaction rate constant) | | (0.03) | (0.19) | (0.29) | (0.44) | reaction temperature: 150° C.
pressure: 1.3 MPa
W/F: 0.34 g of cat. min/mol
ratio of hydrogen/stock oil: 1.60 mol/mol
stock oil: thiophene $2.83 \times 10^{-4}$ mol/mol − toluene
olefin: 20 mol% + toluene 80 mol %

Phase 1: The initial activities of a catalyst for the hydrodesulfurization of thiophene, the hydrogenation of 1-octene and the hydrogenation of diisobutylene were measured at 150° C.

Phase 2: Each reaction was effected in the presence of pyridine (P as shown in the FIGURE, 0.01 mol/mol stock oil) and the reaction inhibition effects of pyridine were measured. Due to the presence of pyridine, the activity of the catalyst in each case was greatly decreased. Next, the catalyst was returned to an atmosphere absent pyridine, and the recovery in catalytic activity was determined. The recovery of hydrodesulfurization activity with respect to thiophene was greater than the recovery of hydrogenation reaction activity with respect to the olefins.

Phase 3: The temperature was raised to 200° C. and then returned to 150° C. at which temperature the recovery of catalytic activity was again determined.

Phase 4: The temperature was raised to 300° C. and then returned to 150° C. at which temperature the recovery of catalytic activity was once again determined. The hydrodesulfurization activity with respect to thiophene substantially recovered to about 100%, but the hydrogenation activity with respect to the olefins recovered to only about 50%. Thus, the hydrodesulfurization selectivity was improved by treating the catalyst with the basic organic compound.

It was found that a basic organic nitrogen compound weakly adsorbs onto a hydrodesulfurization active site and, to the contrary, is strongly adsorbed onto a hydrogenation active site for hydrogenating an olefin. This is a completely novel phenomenon discovered for the first time by the present inventors. On the basis of this finding, the present inventors invented a method of selectively hydrodesulfurizing a catalytic cracked gasoline.

The hydrodesulfurization catalyst for use in the present invention can be based on a catalyst currently used in industry, e.g., a catalyst wherein cobalt-molybdenum or nickel-molybdenum is supported on an alumina carrier. A catalyst comprising a third component such as phosphorus or an alkali metal added thereto can also be used. After presulfiding the catalyst according to a known method (e.g., Catalysis vol. 11, page 25, edited by J. R. Anderson), the catalyst is then modified with a basic organic nitrogen compound.

The basic organic nitrogen compound for use in the present invention includes amines, pyridine or alkyl-substituted pyridines, piperidines or alkyl-substituted piperidines, quinolines or alkyl-substituted quinolines and pyrrole or alkyl-substituted pyrroles. More specifically, examples of the basic organic nitrogen compound include pyridine, methylpyridine, dimethylpyridine, ethylpyridine, piperidine, methylpiperidine, quinoline, methylquinoline and pyrrole. In particular, (alkyl) pyridines have a small influence on the hydrodesulfurization reaction so that they desirably provide a high desulfurization selectivity. Furthermore, pyridine has entirely no influence on the hydrodesulfurization reaction and, therefore, is most preferred for use as the basic organic nitrogen compound.

In a case where a basic organic nitrogen compound is supplied to a catalyst layer, it can be supplied alone or in admixture with an appropriate hydrocarbon oil. For example, the basic organic nitrogen compound can be supplied in the form of a mixture with naphtha (nitrogen content 0.1 to 1.0 wt %). As a total amount, the basic organic nitrogen compound is preferably supplied in an amount of more than 10 mols per mol of supported metal. The optimum supply amount varies depending on the filling state of the catalyst which in turn is affected by diffusion within the catalyst. Even if the basic organic nitrogen compound is supplied in an excess amount, particular problems do not arise. However, the obtainable effects do not further increase. A basic organic nitrogen compound mixed with a catalytic cracked gasoline, e.g., a stock oil, can be supplied to the catalyst. However, the olefin contained therein is adsorbed on a hydrogenation active site for the olefin to thereby decrease the adsorption efficiency of the basic organic nitrogen compound. Therefore, a hydrocarbon oil free from olefins is desirably used.

The basic organic nitrogen is preferably supplied to the catalyst at a low temperature. However, in order to be uniformly adsorbed onto the catalyst surface, the basic organic nitrogen compound is more preferably supplied in the gas phase. When the supply temperature exceeds 200° C., hydrogenating cracking occurs to decrease the adsorption efficiency. Therefore, the supply temperature is preferably 200° C. or lower. In the case of using pyridine, the supply temperature is suitably around 150° C.

It is effective that the basic organic nitrogen compound adsorbed on the hydrodesulfurization active sites is desorbed (it is not clear whether desorption occurs, namely, it is possible that hydrocracking may occur) to recover the hydrodesulfurization activity. The temperature must be raised in order to cause desorption. When the reaction temperature is sufficiently high, e.g., 250° C. or more, the reaction temperature can be raised while catalytic cracking of gasoline is carried out. On the other hand, when the reaction temperature is not sufficiently high, the temperature is raised to 250° C. while separately supplying a hydrocarbon oil to recover the desulfurization activity. However, if the heating temperature is excessively raised, the recovery of the olefin hydrogenation activity becomes high to thereby result in a decrease in hydrodesulfurization selectivity. The optimum temperature depends on the kind of basic organic nitrogen compound that is selected. For pyridine, it is most effective to heat to about 300° C.

The hydrodesulfurization reaction apparatus for use in the present invention may be an ordinary stationary bed flowing type apparatus. The reaction conditions of the hydrodesulfurization are not particularly limited. Reaction conditions are preferably selected so that the hydrogenation of olefins is suppressed, e.g., a temperature of 200 to 300° C., a pressure of 0.5 to 3 MPa, and a hydrogen/oil ratio of 500 to 3000 scf/bbl.

When the hydrodesulfurization selectivity decreases over time, the modification treatment with a basic organic nitrogen compound can be carried out again.

The spent catalyst can be used repeatedly by carrying out an ordinary calcinating regeneration treatment.

The present invention can be applied to any catalytic cracked gasoline having a boiling point of 30 to 250° C. and an olefin content of from 1 to 50 vol %. However, as the olefin content of the catalytic cracked gasoline increases, the effects of the present invention become more pronounced.

The gasoline of the present invention comprises the catalytic cracked gasoline processed by the hydrodesulfurization method described above, generally in an amount of from 5 to 60 vol %, preferably 10 to 40 vol % of the gasoline.

EXAMPLES

The present invention is explained in further detail by way of the following Examples. However, the present invention should not be construed as being limited thereto. The catalyst used in the following Examples was comprised 4 wt % of CoO and 15 wt % of $MoO_3$ supported on alumina.

Example 1

The above-described catalyst was filled into two reaction tubes each in an amount of 4 ml and presulfided at 300° C. Afterwards, the temperature was lowered to 150° C. Toluene was run through one of the reaction tubes, while toluene containing 0.1 wt % pyridine was run through the other reaction tube at an LHSV of 3.5 $hr^{-1}$ and a hydrogen/oil ratio of 1000 scf/bbl for two hours. Thereafter, the temperature was raised to 300° C., and a toluene solution of thiophene ($2.83 \times 10^{-4}$/mol) was run through both reaction tubes.

The temperature was lowered to 190° C., and a model experiment was carried out using, as a model compound, thiophene ($2.83 \times 10^{-4}$ mol %)+1-octene (20 mol %)+toluene (80 mol %). Furthermore, a model experiment was carried out at a reaction temperature of 175° C. and using, as a stock material oil, thiophene ($2.83 \times 10^{-4}$ mol %)+diisobutylene (20 mol %)+toluene (80 mol %). The experimental procedure was shown in FIG. 1. In FIG. 1, T means thiophene+toluene feedstock, N means 1-octane+toluene feedstock, I means diisobutylene+toluene feedstock and P means pyridine spiked feedstock. The experimental results are shown in Table 2. When pyridine modification was carried out, the olefin hydrogenation reaction was suppressed and hydrodesulfurization selectivity was improved.

TABLE 2

| stock oil | thiophene + diisobutylene + toluene | | | | | | thiophene + 1-octene + toluene | | | | | |
|---|---|---|---|---|---|---|---|---|---|---|---|---|
| pyridine modification | no | | | yes | | | no | | | yes | | |
| reaction temperature (° C.) | 175 | | | 175 | | | 190 | | | 190 | | |
| W/F; g-cat. min/mol | 0.34 | 0.24 | 0.17 | 0.34 | 0.24 | 0.17 | 0.34 | 0.24 | 0.17 | 0.34 | 0.24 | 0.17 |
| thiophene hydrodesulfurization percentage (wt %) | 65.3 | 50.4 | 42.8 | 59.7 | 49.6 | 41.7 | 70.7 | 52.4 | 36.1 | 71.2 | 64.1 | 44.9 |
| olefin hydrogenation percentage (vol %) | 7.9 | 5.1 | 3.7 | 2.8 | 2.0 | 1.5 | 13.3 | 9.4 | 7.3 | 9.1 | 6.1 | 4.7 | pressure: 1.3 MPa
W/F: 0.34 g of cat. min/mol
ratio of hydrogen/stock oil: 1.60 mol/mol
stock oil: thiophene concentration $2.83 \times 10^{-4}$ mol/mol
olefin 20 mol %, toluene 80 mol %

Example 2

Following the experiment of Example 1, catalytic cracked gasoline was run through both reactors to effect hydrodesulfurization. The properties of the catalytic cracked gasoline were: boiling point 48 to 231° C., density 0.778 (20° C.), sulfur content 229 ppm, olefin content 30.4 vol % and research octane number 87.0. The reaction was carried out at a temperature 240° C., an LHSV of 7 $hr^{-1}$ and a hydrogen/oil ratio of 1000 scf/bbl. The results are shown in Table 3.

TABLE 3

| Pyridine modification | no | yes |
|---|---|---|
| Desulfurization percentage (wt %) | 78.6 | 76.9 |
| Olefin hydrogenation percentage (vol %) | 11.5 | 7.2 |
| Research octane number | 85.5 | 86.1 |

Reaction temperature: 240° C.
pressure: 1.0 MPa
LHSV: 7.0 $hr^{-1}$
ratio of hydrogen/stock oil: 1000 scf/bbl
stock oil: catalytic cracked gasoline As shown above, when the catalyst was modified with pyridine, the hydrogenation of olefins was suppressed to thereby improve the hydrodesulfurization selectivity. Furthermore, the decrease in octane number was suppressed to a low level.

When the catalyst is modified with a basic organic nitrogen compound for use in hydrodesulfurizing catalytic cracked gasoline, the hydrogenation of olefins is considerably decreased while the desulfurization activity is maintained so that hydrodesulfurization selectivity is improved. Therefore, the decrease in octane number can be suppressed to a low level.

While the invention has been described in detail and with reference to specific embodiments thereof, it will be apparent to one skilled in the art that various changes and modifications can be made therein without departing from the spirit and scope thereof.

What is claimed is:

1. A method of hydrodesulfurizing a catalytic cracked gasoline which comprises providing a presulfided catalyst modified with a basic organic nitrogen compound and contacting the catalytic cracked gasoline with the catalyst, wherein the presulfided catalyst is contacted with the basic organic nitrogen compound in the absence of catalytic cracked gasoline at a temperature of 200° C. or lower to prepare the catalyst.

2. The method as claimed in claim 1, wherein said catalyst comprises cobalt-molybdenum or nickel-molybdenum supported on an alumina carrier.

3. The method as claimed in claim 1, which comprises providing a catalyst prepared by sulfiding a catalyst comprising cobalt-molybdenum or nickel-molybdenum supported on an alumina carrier and then contacting the presulfided catalyst with a basic organic nitrogen compound.

4. The method as claimed in claim 1, wherein said basic organic nitrogen compound is adsorbed onto the presulfided catalyst.

5. The method as claimed in claim 3, wherein said basic organic nitrogen compound is adsorbed onto the presulfided catalyst.

6. The method as claimed in claim 1, wherein said basic organic nitrogen compound is selected from the group consisting of amines, pyridine or alkyl-substituted pyridines, piperidines or alkyl-substituted piperidines, quinolines or alkyl-substituted quinolines and pyrrole or alkyl-substituted pyrroles.

7. The method as claimed in claim 3, wherein said basic organic nitrogen compound is selected from the group consisting of amines, pyridine or alkyl-substituted pyridines, piperidines or alkyl-substituted piperidines, quinolines or alkyl-substituted quinolines and pyrrole or alkyl-substituted pyrroles.

8. The method as claimed in claim 1, wherein said basic organic nitrogen compound comprises pyridine or alkyl-substituted pyridines.

9. The method as claimed in claim 3, wherein said basic organic nitrogen compound comprises pyridine or alkyl-substituted pyridines.

10. The method as claimed in claim 1, wherein said basic organic nitrogen compound comprises pyridine.

11. The method as claimed in claim 3, wherein after the catalyst is prepared hydrodesulfurizing is conducted at a temperature of 250° C. or higher.

12. The method as claimed in claim 3, which comprises contacting the presulfided catalyst with an olefin-free hydrocarbon oil containing a basic organic nitrogen compound to prepare the catalyst.

13. The method as claimed in claim 3, which comprises contacting the presulfided catalyst with a basic organic nitrogen compound in a gaseous phase to prepare the catalyst.

14. The method as claimed in claim 1, which comprises hydrodesulfurizing at a temperature of 200 to 300° C., a pressure of 0.5 to 3 MPa and a hydrogen/oil ratio of 500 to 3000 scf/bbl.

* * * * *